United States Patent [19]
Gostin et al.

[11] Patent Number: 5,649,144
[45] Date of Patent: Jul. 15, 1997

[54] APPARATUS, SYSTEMS AND METHODS FOR IMPROVING DATA CACHE HIT RATES

[75] Inventors: Gary B. Gostin; Gregory D. Brinson, both of Plano; Todd H. Beck, Garland; David L. Trawick, Plano, all of Tex.

[73] Assignee: Hewlett-Packard Co., Palo Alto, Calif.

[21] Appl. No.: 705,023

[22] Filed: Aug. 29, 1996

Related U.S. Application Data

[63] Continuation of Ser. No. 258,790, Jun. 13, 1994, abandoned.
[51] Int. Cl.$^6$ .................................................. G06F 13/00
[52] U.S. Cl. .............................. 395/421.1; 395/421.03; 395/421.05; 395/421.04; 395/800; 395/464; 395/566
[58] Field of Search ............................. 395/800, 566, 395/401, 403, 451, 414, 405, 464, 421.04, 421.03, 421.05, 421.1

[56] References Cited

U.S. PATENT DOCUMENTS

| | | | |
|---|---|---|---|
| 4,371,924 | 2/1983 | Schaefer | 395/421.03 |
| 4,583,162 | 4/1986 | Prill | 395/421.03 |
| 5,287,487 | 2/1994 | Priem et al. | 395/414 |
| 5,357,618 | 10/1994 | Mirza et al. | 395/403 |
| 5,361,391 | 11/1994 | Westberg | 395/464 |
| 5,442,767 | 8/1995 | Eickemeyer et al. | 395/401 |
| 5,499,355 | 3/1996 | Krishamohan et al. | 395/464 |
| 5,581,778 | 12/1996 | Chin et al. | 395/800 |

*Primary Examiner*—Larry D. Donaghue

[57] ABSTRACT

A processing system is provided which generates a memory address and presents the memory address to a cache to retrieve corresponding data when such corresponding data is encached therein. The memory address is presented to a main memory to retrieve the corresponding data therefrom when such corresponding data is not encached in cache. An offset address to the memory address is used to obtain a prefetch address which in turn is presented to the main memory to retrieve selected information stored within memory. The cache then stores the selected information retrieved from the main memory.

20 Claims, 1 Drawing Sheet

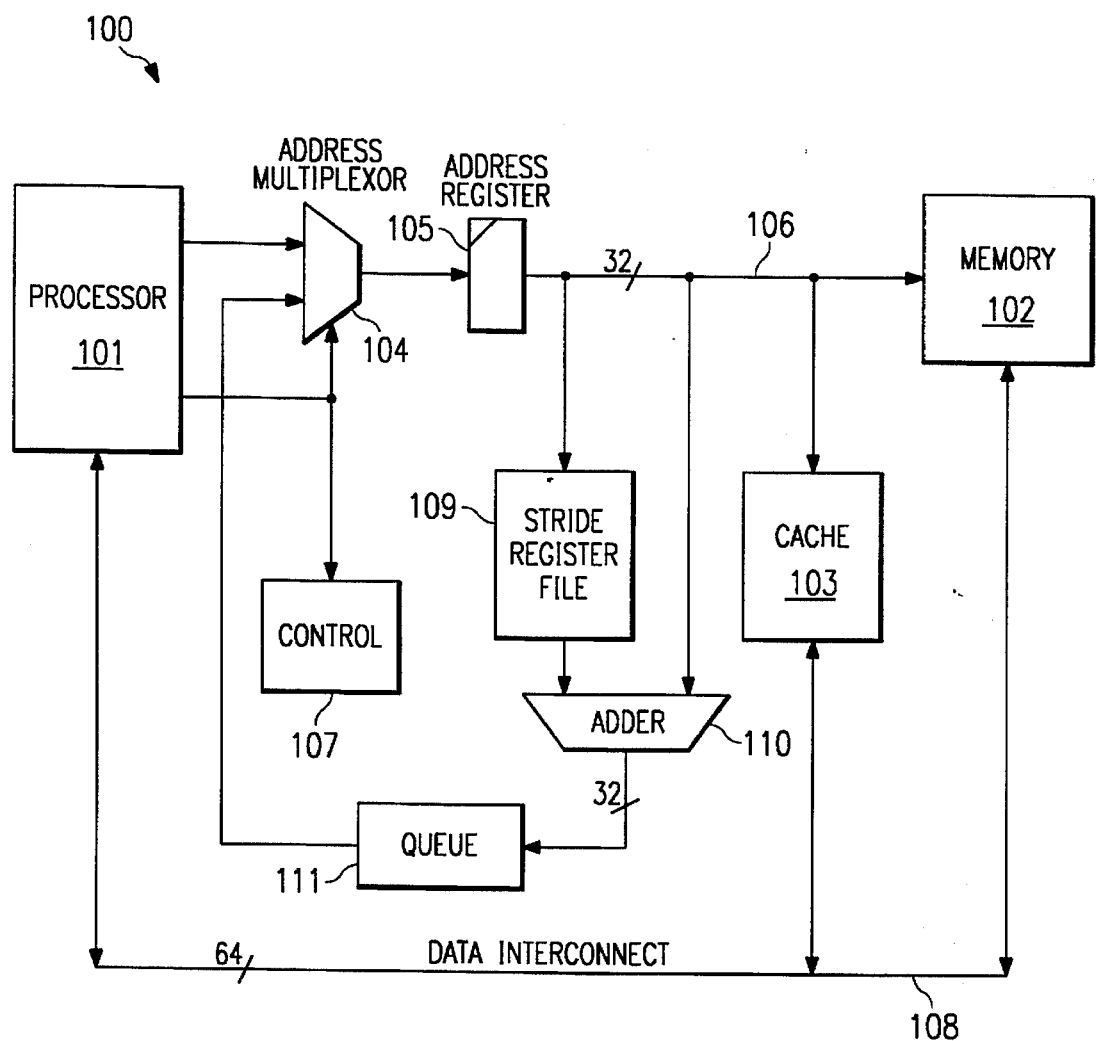

5,649,144

APPARATUS, SYSTEMS AND METHODS FOR IMPROVING DATA CACHE HIT RATES

CROSS REFERENCE TO RELATED APPLICATIONS

This is a continuation of application Ser. No. 08/258,790 filed on Jun. 13, 1994, now abandoned.

TECHNICAL FIELD OF THE INVENTION

The present invention relates in general to data processing systems and in particular to apparatus, systems and methods for improving data cache hit rates.

BACKGROUND OF THE INVENTION

Modern processing systems frequently use high speed data caches to decrease the time required to transfer data from main memory to associated processing devices. In these systems, a block of data or "cache line" is prefetched from main memory and loaded (encached) in a small high speed data memory or "data cache." A cache line can have a length of one or more operands as desired. The particular data block retrieved from main memory is one which the processor has determined most likely includes particular data that the processor will need for an upcoming operation. If the necessary data is found in the encached data block at the time of the operation, the processor need only access the data from the faster cache memory rather than the larger and slower main memory. The resulting reduction in data access time helps reduce the execution time of the programs being run by the processor.

One of the most significant factors determining the effectiveness of a particular cache design is the percentage of loads which are satisfied by the cache. This percentage is typically referred to as the cache hit rate. As the cycle time of processors becomes faster, and the number of processor cycles needed to access main memory increases, the cache hit rate becomes the dominant factor in determining cache effectiveness. Thus, because of the utility of data caches in improving system operation speed, substantial efforts have been made to improve cache effectiveness through improved cache hit rates.

One common method for improving cache hit rates has been the use of long cache lines. In this method, when a request for data by the processor is not satisfied by the encached data, the processor issues a read to main memory for a block of data that contains the desired datum. The entire retrieved block, which typically consists of data from a number of adjacent main memory locations, is then stored in the cache. By encaching larger data blocks from a number of locations (i.e. longer cache lines) the chance that subsequent requests for nearby data will be satisfied by the cache is improved. Unfortunately, the use of long cache lines significantly increases amount of data which must be transferred from main memory, thereby consuming more memory bandwidth. Further, long cache lines are ineffective when requests for data do not exhibit spatial locality (i.e. the data needed by the processor are not all stored in nearby locations in the memory address space and therefore cannot always be accessed in a single cache line).

A simple sequential hardware prefetch is a common method for improving cache hit rates. In this method, when a request is issued for the last entry in a cache line stored in the cache memory, the next sequential cache line is read from main memory and encached. While this method is very effective at improving the cache hit rate for sequences of memory requests for data with spatial locality, it does not improve the hit rate for request sequences which call for data stored in widely spaced memory locations.

Software prefetching is another method for improving cache hit rates. In this method, a cache load instruction is defined which transfers a block of data from memory to the cache. The address of this block of data is computed by the processor using a sequence of instructions, and therefore is not restricted to being spatially adjacent in the processor address space to a previous load address. While software prefetching is effective at improving the cache hit rate for loads of non-sequential sequences of data, it is subject to several drawbacks. First, performance overhead is required to execute the additional instructions needed to compute the prefetch address and execute the prefetch load instruction. The additional overhead can offset any performance gain achieved by improved cache hit rate. Although this overhead can be reduced by providing the processor with the ability to execute multiple instructions each cycle, this capability is expensive in terms of processor hardware. Second, the software prefetching technique consumes general purpose registers within the processor. This increases the chance of register spills, with any register spills only further slowing system operation.

Thus, the need has arisen for apparatus, systems and methods for improving data cache hit rates. Such apparatus, systems and methods should eliminate the problems associated with current systems which rely on spatial locality when prefetching cache lines. In particular, such apparatus, systems and methods should allow the retrieval of cache lines located at widely separated or non-sequential locations in the processor address space. Such apparatus, systems and methods should employ a minimum of hardware, should minimize the amount of processing overhead required, and should provide access to widely spaced and non-sequential cache lines.

SUMMARY OF THE INVENTION

The principles of the present invention generally provide for improved cache hit rates in processing systems employing a cache memory system. These principles also generally provide for the transfer from main memory to cache memory of a sequence of data blocks or cache lines which may or may not be adjacently located in the main memory address space. Further, the principles of the present invention allow for the generation of prefetch addresses for the encachement of corresponding data without the need to interrupt other memory operations.

According to a first embodiment of the present invention, a system is provided which includes means for generating a memory address, and means for presenting the memory address to a cache to retrieve corresponding data from the cache when such data is stored therein and for presenting the memory address to a main memory to retrieve the corresponding data therefrom when such data is not encached in the cache. Means are included for adding an offset value to the memory address to obtain a prefetch address. Means are also provided for presenting the prefetch address to the main memory in order to retrieve selected data stored therein. The selected data retrieved from the main memory in response to the prefetch address may then be stored in the cache.

According to a second embodiment of the present invention, a processing system is provided which includes a processor operable to execute an instruction which generates a memory address and offset select information. A multiplexer is included which has a first input coupled to the processor for selectively passing the memory address and the offset select information from the processor to an address interconnect. Prefetch generation circuitry is also provided which includes a register file, an adder, and an interconnect. The register file includes at least one register for storing an address offset value and is operable to output an address offset value in response to the offset select information provided by the processor. The adder includes a first input coupled to the address interconnect and a second input coupled to the register file. The adder is operable to add an address offset value output from the register file and a memory address output from the processor to generate a prefetch address. The interconnect provided as part of the prefetch address generation circuitry couples the prefetch address from the adder to a second input of the multiplexer, the multiplexer being further operable to selectively pass the prefetch address to the address interconnect. A data interconnect is coupled to the processor. A cache is also provided which includes a data port coupled to the data interconnect and an address port coupled to the address interconnect. The cache is operable to store data received from the data interconnect and transfer selected information to the processor via the data interconnect in response to an address. The processing system additionally includes a memory system having an address port coupled to the address interconnect and a data port coupled to the data interconnect and is operable to transfer data to the cache and/or processor via the data interconnect in response to an address, and is operable to receive data from the processor via the data interconnect.

According to another embodiment of the present invention, a method is provided for improving cache hit rate in a processing system including a memory and a cache. A memory address is generated in response to an instruction and then offset to obtain a prefetch address. The cache is then addressed with the prefetch address. In the preferred embodiment of the method, when data corresponding to the prefetch address is encached in the cache, the prefetch address is discarded. When data corresponding to the prefetch address is not encached in the cache, the memory is addressed with the prefetch address and such data is retrieved from the memory in response. The data retrieved from the main memory in response to the prefetch address is then stored in the cache.

In yet another embodiment of the present invention, a method is provided for retrieving from memory and encaching a sequence of data. A memory address is generated and added to an offset to obtain a first prefetch address. A memory is addressed with the first prefetch address to retrieve a first set of data from the memory. The first set of data is then encached in a cache memory. The offset value is next modified to obtain a second offset value. A new memory address is generated and added to the second offset value to obtain a second prefetch address. The memory is addressed with the second prefetch address to retrieve a second set of data which is subsequently encached in the cache memory.

The embodiments of the present invention advantageously eliminate many of the problems associated with current systems which rely on spatial locality when prefetching cache lines. In particular, the embodiments of the present invention allow for the retrieval of cache lines located at widely separated or non-sequential locations in the processor address space. Systems embodying the principles of the present invention employ a minimum of hardware and require a minimum of processor overhead. Further, the required memory bandwidth is minimized and system operating speed maximized since, preferably, prefetching data to cache is only performed when other memory operations are not taking place.

BRIEF DESCRIPTION OF THE DRAWINGS

For a more complete understanding of the present invention, and the advantages thereof, reference is now made to the following descriptions taken in conjunction with the accompanying drawings, in which:

The FIGURE is a functional block diagram of a processing system embodying the principles of the present invention.

DESCRIPTION OF THE INVENTION

FIG. 1 is a functional block diagram of a processing system 100 embodying the principles of the present invention. The primary components of system 100 include a processor 101, a main memory system 102 and a cache memory system 103. Processor 101 can be implemented using any one of a number of known architectures; in a preferred embodiment processor 101 is a vector and scalar processor operating on 64-bit wide data words and 32-bit wide addresses. Memory system 102 can be of any desired size and can be implemented using any one of a number of available technologies. For example, in the preferred embodiment, memory system 102 is implemented using a plurality of banks of dynamic random access memory devices as described in copending and coassigned patent application Ser. No. 08/161,937, entitled "Apparatus Systems and Methods For Controlling Electronic Memories" and incorporated herein by reference. Cache memory system 103 is also of a known design and has a total size, cache line length, and multi-set associativity selected as required to implement the desired overall design of system 100.

Addresses from processor 101 are selectively coupled to the address port of main memory 102 and cache 103 through a first port of an address multiplexer 104, an address register 105 and an address interconnect 106. Address interconnect 106 may include buses, may be constructed, in whole or in part, as part of a crossbar, or from other suitable interconnection circuitry known in the art. Address multiplexer 104 is controlled by processor 101 and associated control circuitry 107. Data is exchanged between processor 101, main memory 102 and cache memory system 103 via a data interconnect 108. Similar to address interconnect 106, data interconnect 108 may include a bus or may be constructed, in whole or in part, as part of a crossbar, or from other suitable interconnection circuitry known in the art.

According to the principles of the present invention, system 100 is provided with a stride register file 109, an adder 110 and a queue 111. As discussed further below, stride register file 109 receives register select information from address register 105 via address interconnect 106 and outputs in response an address offset value stored in a corresponding register therein to a first input port of adder 110. A second input port to adder 110 is coupled to address interconnect 106 to directly receive addresses presented on interconnect 106. In the illustrated embodiment, the output of adder 110 (which, as discussed below, is a prefetch address) is coupled back to a second input port of address multiplexer 104 through queue 111. Queue 111 may for example hold zero, one or a plurality of prefetch addresses. In alternate embodiments queue 111 is not included and the output of adder 110 is coupled directly to the second input port of multiplexer 104.

During a conventional load of a datum to processor 101, memory request (load) addresses are generated by processor 101 and sent through address multiplexer 104 to address register 105. From address register 105, a given address is first input by cache system 103 to attempt to retrieve a desired datum from the encached data held therein. As with conventional cache systems, each datum of a given cache line retrieved from memory 102 is stored in cache 103 along with its associated address. Thus to determine if a desired datum is within the cache such that a processor request (load) can be satisfied, the cache system 103 compares the address issued by the processor during a load with those of the encached data. When an address match occurs, the desired data is found in the cache. If cache 103 contains that datum, cache 103 sends the datum through data interconnect 108 to processor 101. If the cache does not contain the desired datum, the address is sent to main memory 102. Main memory 102 accesses the cache line containing desired datum, and sends it through data interconnect 108 to both processor 101 and cache 103 for encachement.

In addition to a conventional instruction set controlling conventional memory operations, processor 101, according to the principles of the present invention, can execute two new additional types of instructions. The first new instruction type directs processor 101 to transfer an integer value to any selected register within stride register file 109. This transfer may be performed through any available interconnect path; in the illustrated embodiment such an integer value may be transferred to register file 109 via address interconnect 106. This integer value operates as an address offset.

The second new instruction type is a load-with-stride instruction. A single one of this second type of instruction directs processor 101 to generate an address to cache 103 to access a desired datum and register select information to select a given stride register within stride register file 109. Both the address and stride register selection data are sent through the address multiplexer 104 to address register 105. A cache access and a memory access (if required) are then performed, as described above. Then the contents of the selected stride register within stride register file 109 are added to the memory address by adder 110 to generate a prefetch address. It should be noted that the offset value in alternate embodiments may be subtracted from the memory address to generate the prefetch address for example by using two's complement addition. This prefetch address is sent to queue 111, where it can be retained for any desired amount of time. Advantageously, queue 111 may be used to hold a prefetch address until a processing cycle when processor 101 is not sending an address to address register 105 such that a prefetch load to cache 103 will never delay processor 101 from initiating other loads and stores. In other words, prefetch loads, discussed further below, are preferably only initiated during unused memory/cache cycles.

The prefetch address then moves out of queue 111 through the address multiplexer 104 to address register 105, thereby becoming a prefetch load address. This prefetch load address is then input by cache 103. In the preferred embodiment, if the datum addressed by the prefetch load address is contained in cache 103, the prefetch load address is discarded. If the datum addressed by the prefetch address is not in cache 103, the prefetch address is input by memory system 102. Memory system 102 accesses the cache line containing the desired datum, and sends it through the data interconnect 108 to cache 103 for encachement. If this datum arrives in cache 103 before an attempt is made by the processor to load it, then a cache miss is avoided, thereby improving the cache hit rate.

System 100 advantageously eliminates most of the drawbacks of the prior art. Since a given stride register may contain any address offset, a sequence of cache lines located in memory 102 at either sequential or non-sequential addresses may be correctly prefetched into cache 103. Further, sequences of cache lines separated by varying offsets may also be prefetched by either using multiple stride registers in register file 109 or by varying the contents of a single stride register. In these cases, a sequence of memory addresses from processor 101 may be added to selected offset values from stride register file 109 to obtain a sequence of prefetch addresses, the sequence of prefetch addresses either stepping or jumping through memory 102 to retrieve cache lines. Additionally, since the address calculations for the prefetch data are performed by hardware outside of processor 101, no processor performance overhead is incurred for a prefetch. In the preferred embodiment, since prefetch loads are never sent to memory 102 for data already in data cache 103, most of the excess memory bandwidth is eliminated. Finally, since prefetch loads may remain in queue 111 until a cycle where the processor is not sending an address to the address register, prefetch loads will never delay the processor from initiating other loads and stores.

Although the present invention and its advantages have been described in detail, it should be understood that various changes, substitutions and alterations can be made herein without departing from the spirit and scope of the invention as defined in the appended claims.

What is claimed is:

1. A system comprising:

means for generating a memory address;

means for generating offset register selection information;

means for storing said memory address and said generated offset selection information;

means for presenting said stored memory address to a cache to retrieve corresponding data from said cache when said corresponding data is encached therein;

means for presenting said stored memory address to a main memory to retrieve said corresponding data therefrom when said corresponding data is not encached in said cache;

means for adding an offset value contained in said selected offset register to said memory address to obtain a prefetch address;

means for presenting said prefetch address to a main memory to retrieve corresponding prefetch data stored in said main memory; and means for storing said prefetch data retrieved from the main memory in said cache.

2. The system of claim 1 wherein said means for generating a memory address includes a processor operable to execute an instruction which specifies a memory address and offset register selection information.

3. The system of claim 1 wherein said means for adding an offset value to said memory address comprises an adder having a first input port for receiving said offset value from said selected offset register and a second input port for receiving said memory address from said storage means, said adder operable to add said offset value and said memory address and provide in response said prefetch address.

4. The system of claim 3 wherein said means for presenting said prefetch address to said main memory includes:

a multiplexer for selectively passing said prefetch address provided by said adder to said address register; and an address interconnect for coupling said prefetch address from said address register to said main memory.

5. The system of claim 4 wherein said multiplexer is further operable to selectively pass said memory address and said offset register selection information from said means for generating to said address register.

6. The system of claim 4 and further comprising a queue coupling said adder and said multiplexer for temporarily storing said prefetch address.

7. A processing system comprising:

a processor operable to generate a memory address and offset select information in response to an instruction;

a multiplexer having a first input coupled to said processor operable to selectively pass said memory address and said offset select information to an address interconnect;

prefetch address generation circuitry comprising:

a register file having at least one register for storing an address offset value generated by said processor in response to an instruction and operable to output said address offset value in response to said offset select information;

an adder having a first input coupled to said address interconnect and a second input coupled to said register file, said adder operable to add a said address offset value output from said register file and said memory address output from said processor to generate a prefetch address; and an interconnect coupling said prefetch address from said adder to a second input of said multiplexer, said multiplexer further operable to selectively pass said prefetch address to said address interconnect;

a data interconnect coupled to said processor;

a cache having an address port coupled to said address interconnect and a data port coupled to said data interconnect, said cache operable to store data received from said data interconnect and transfer said selected information to said processor via said data interconnect in response to said memory address; and a memory system having an address port coupled to said address interconnect and a data port coupled to said data interconnect and operable to transfer data to said cache in response to said prefetch address.

8. The system of claim 7 wherein said processor is further operable to generate said address offset values and store address offset values in a selected register in said register file.

9. The system of claim 7 wherein said offset value is transferred from said processor to said register file via said address interconnect.

10. The system of claim 7 wherein said data interconnect comprises a bus.

11. The system of claim 7 wherein said address interconnect comprises a bus.

12. The system of claim 7 wherein at least a portion of said data interconnect forms a portion of a crossbar.

13. The system of claim 7 wherein at least a portion of said address interconnect comprises a portion of a crossbar.

14. The system of claim 7 and further comprising an address register coupling an output of said multiplexer and said address interconnect, said address register storing said memory address and said offset select information.

15. The system of claim 7 and further comprising a queue coupling an output of said adder to said second input of said multiplexer for temporarily storing said prefetch address prior to presentation to said second input of said multiplexer.

16. The system of claim 7 wherein said address interconnect is operable to transfer 32-bit addresses and said data interconnect is operable to transmit 64-bit words of data.

17. A method of improving cache hit rates comprising the steps of:

generating a memory address;

generating stride register select information;

storing said memory address and said stride register select information in an address register;

adding an offset value contained in said selected stride register to the memory address to obtain a prefetch address;

addressing a main memory with the prefetch address to retrieve selected information stored therein; and storing the data retrieved from the main memory in a cache.

18. The method of claim 17 and further comprising the steps of:

prior to said steps of addressing the main memory, addressing the cache with the prefetch address; and discarding the prefetch address when selected information corresponding to the prefetch address is found in the cache.

19. The method of claim 17 and further comprising the steps of:

prior to said step of adding, presenting the memory address to the cache to retrieve corresponding data from the cache when such data is encached therein; and after said step of presenting to the cache, presenting the memory address to the main memory to retrieve the corresponding data therefrom when the corresponding data is not encached in the cache.

20. A processing system comprising:

an addressable memory;

a cache;

a stride register file having first and second stride registers, each stride register specifying a stride;

an address register; and a processor operable to:

execute a first instruction specifying the address register and causing the transfer of a value in the address register to the first stride register; and execute a second instruction specifying the address register and the second stride register and causing the transfer of a value in the memory specified by an address in the address register and the stride in the second stride register to the cache if the value is not already within the cache.

* * * * *